United States Patent
Shogaki

(10) Patent No.: US 10,713,393 B2
(45) Date of Patent: Jul. 14, 2020

(54) INFORMATION PROCESSING SYSTEM, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yohei Shogaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 192 days.

(21) Appl. No.: 15/831,669

(22) Filed: Dec. 5, 2017

(65) Prior Publication Data

US 2018/0173902 A1    Jun. 21, 2018

(30) Foreign Application Priority Data

Dec. 15, 2016 (JP) .................... 2016-243680

(51) Int. Cl.
*G06F 21/84* (2013.01)
*G06F 3/0481* (2013.01)
(Continued)

(52) U.S. Cl.
CPC .......... *G06F 21/84* (2013.01); *G06F 3/038* (2013.01); *G06F 3/04812* (2013.01); *G06F 3/1454* (2013.01); *H04L 12/4641* (2013.01); *H04N 1/0035* (2013.01); *H04N 1/00204* (2013.01); *H04N 1/00405* (2013.01);
(Continued)

(58) Field of Classification Search
CPC .... G06F 21/84; G06F 30/4812; G06F 31/454; G06F 9/452; G06F 2203/0383; H04L 12/4641; H04N 1/0035
See application file for complete search history.

(56) References Cited

U.S. PATENT DOCUMENTS 8,640,193 B2 * 1/2014 Shigeeda ............. G06F 21/608
                                                                726/2
8,904,473 B2 * 12/2014 Sambamurthy ....... G06F 21/554
                                                                726/1
(Continued)

FOREIGN PATENT DOCUMENTS

JP      2014153776 A    8/2014

OTHER PUBLICATIONS

Tomoharu Nakamura, Tomoya Yano, Kohki Watanabe, Yui Ishii, Hideki Ono, Ippei Tambata, Nobuki Furue, Juji Nakahata, SIGGRAPH: ACM SIGGRAPH 2019 Emerging Technologies . Jul. 2019, Article No. 1, pp. 1-2.*

(Continued)

*Primary Examiner* — Kambiz Zand
*Assistant Examiner* — Mohammad S Shams
(74) *Attorney, Agent, or Firm* — Venable LLP

(57) ABSTRACT

An information processing apparatus that transmits image information being displayed on a display unit to a client to causes the client to display the image information, when combining an image of a cursor with the image information being displayed on the display unit and storing a result of the combining, in a case that it is determined that the image information is information of a screen for inputting information having confidentiality, restricts viewing of the image of the cursor in the image information and transmits the image information in which the viewing of the image of the cursor is restricted to the client.

10 Claims, 5 Drawing Sheets

(51) Int. Cl.
    *G06F 3/14*        (2006.01)
    *H04L 12/46*     (2006.01)
    *G06F 3/038*     (2013.01)
    *H04N 1/00*      (2006.01)
    *H04N 1/44*      (2006.01)

(52) U.S. Cl.
    CPC ... *H04N 1/4413* (2013.01); *G06F 2203/0383* (2013.01); *H04N 2201/0089* (2013.01); *H04N 2201/0094* (2013.01)

(56) References Cited

U.S. PATENT DOCUMENTS

| | | | |
|---|---|---|---|
| 9,075,513 B2* | 7/2015 | Shogaki | G06F 3/0416 |
| 9,148,443 B2* | 9/2015 | Chizeck | G06F 21/316 |
| 9,972,231 B1* | 5/2018 | Furutani | B41J 29/42 |
| 10,089,496 B2* | 10/2018 | Fukasawa | H04N 1/00151 |
| 2003/0115481 A1* | 6/2003 | Baird | G06F 21/6218 726/4 |
| 2003/0122806 A1* | 7/2003 | Edge | H04N 1/6011 345/204 |
| 2004/0093598 A1* | 5/2004 | Haga | G06F 8/65 717/173 |
| 2005/0243364 A1* | 11/2005 | Sakai | G06F 21/608 358/1.15 |
| 2006/0103508 A1* | 5/2006 | Sato | G06F 3/038 340/286.01 |
| 2006/0282867 A1* | 12/2006 | Mizuhashi | H04N 17/04 725/105 |
| 2007/0081184 A1* | 4/2007 | Daos | H04N 1/00127 358/1.15 |
| 2007/0253035 A1* | 11/2007 | Takesada | H04N 1/00395 358/468 |
| 2008/0013862 A1* | 1/2008 | Isaka | G06T 1/20 382/303 |
| 2008/0042923 A1* | 2/2008 | De Laet | G05B 15/02 345/1.3 |
| 2008/0291494 A1* | 11/2008 | Kanoh | H04N 1/32106 358/1.15 |
| 2008/0303842 A1* | 12/2008 | Okamoto | G06F 3/048 345/629 |
| 2011/0033040 A1* | 2/2011 | Nakashima | G06F 3/1454 380/28 |
| 2011/0051182 A1* | 3/2011 | Sugiyama | H04N 1/00326 358/1.15 |
| 2011/0211222 A1 | 9/2011 | Shogaki | |
| 2011/0231909 A1* | 9/2011 | Shibuya | G06F 21/31 726/5 |
| 2011/0291834 A1* | 12/2011 | Boldyrev | G07C 9/20 340/572.1 |
| 2012/0268477 A1 | 10/2012 | Shogaki | |
| 2013/0042169 A1* | 2/2013 | Reedy | H04L 67/02 715/202 |
| 2013/0067541 A1* | 3/2013 | Itoh | H04N 1/0097 726/4 |
| 2014/0101784 A1* | 4/2014 | Shukla | G06F 21/6218 726/30 |
| 2014/0189115 A1* | 7/2014 | Eggert | H04W 12/06 709/225 |
| 2014/0223380 A1* | 8/2014 | Ikeda | G06F 3/04812 715/856 |
| 2014/0253297 A1* | 9/2014 | Kawaguchi | G06Q 10/083 340/10.51 |
| 2015/0149923 A1 | 5/2015 | Shogaki | |
| 2015/0227730 A1* | 8/2015 | Grigg | G06F 21/31 726/7 |
| 2015/0278534 A1* | 10/2015 | Thiyagarajan | G06F 21/62 726/28 |
| 2016/0026253 A1* | 1/2016 | Bradski | G02B 27/0172 345/8 |
| 2017/0041504 A1* | 2/2017 | Fukuda | H04N 1/4413 |
| 2017/0279821 A1* | 9/2017 | Flowers | G06F 9/30145 |
| 2017/0351478 A1* | 12/2017 | Shan | G06F 3/1454 |
| 2018/0074601 A1* | 3/2018 | Nakayama | G06F 16/40 |
| 2018/0081444 A1* | 3/2018 | Youoku | G06F 3/038 |
| 2018/0152440 A1* | 5/2018 | Hande | H04L 63/0815 |
| 2018/0160002 A1* | 6/2018 | Nishiyama | H04W 76/14 |
| 2018/0307871 A1* | 10/2018 | Rollins | G06F 21/84 |
| 2019/0034657 A1* | 1/2019 | Ford | G06F 21/552 |
| 2019/0392166 A1* | 12/2019 | Awad | G06F 3/0623 |

OTHER PUBLICATIONS

Mark Rice, Marcus Wan, Min-Hui Foo, Jamioe Ng, Zyuie Wai, Janell Kwok, Samuel Lee, Linda Teo. Sandbox: Proceedings of the 2011 ACM SIGGRAPH Symposium on Video Games. Aug. 2011, p. 17-24.*

* cited by examiner

INFORMATION PROCESSING SYSTEM, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

As product usage and troubleshooting becomes more complicated, customers (users) frequently call a call center of a manufacturer to ask questions directly and get answers relating to usage, troubleshooting, and the like. A system that, in order to appropriately and quickly deal with such troubles, provides support by directly logging into a terminal of a user from a remote location and changing settings of an environment of the user is considered.

Also, in recent years, it has become possible to use VNC (Virtual Network Computing) to cause another computer to display a desktop screen of a particular computer via a network and perform operations. By using such a technique, it becomes possible for an operator of a call center to remotely control a customer's apparatus and support maintenance of the apparatus or operations by the customer, for example. Also, the operator of the call center can remotely control the customer's apparatus, and can describe in an easy to understand manner an operation procedure of the apparatus to the customer by showing a track of operations made by a cursor or the like.

Also, when performing support with respect to an image processing apparatus that does not normally display a cursor in which, for example, a method of setting or a method of operating the apparatus is explained, causing the image processing apparatus to display a cursor in order to smoothly perform support from a remote location has been considered. Accordingly, a system for describing, for example, a method of setting or a method of operating an apparatus by causing a displayed cursor to move on the image processing apparatus following a track of operations made by a cursor at a call center or the like has been considered (for example, with reference to Japanese Patent Laid-Open No. 2014-153776).

A cursor display on an image processing apparatus is generally performed by control by an operating system on the image processing apparatus. For the cursor display, when a touch operation is performed on an operation panel, the cursor display generally is moved to a touched position.

A virtual keyboard (or a screen keyboard or a software keyboard) is used in a state in which a screen displayed on a display unit of an image processing apparatus, by using the foregoing VNC or the like, is published on an external device of a remote location side. At that time, a cursor will move and be displayed by the external device on keys selected by touch operations on the image processing apparatus. Accordingly, in the image processing apparatus, the user of the external device will know what keys were selected, and particularly in a case of inputting a password of the like by using a virtual keyboard screen, a problem arises in that security is not maintained.

SUMMARY OF THE INVENTION

An aspect of the present invention is to eliminate the above-mentioned problem with conventional technology.

A feature of the present invention is to provide a technique in which, in a case where a screen having confidentiality is displayed when image information of a displayed screen is transmitted to a client to cause the client to display the image information, a cursor is caused not to be displayed on the screen.

According to a first aspect of the present invention, there is provided an information processing system having a first information processing apparatus for distributing image information for display and a second information processing apparatus for receiving and displaying the image information, wherein the first information processing apparatus comprises: a first memory device that stores a set of instructions; and at least one processor that executes the instructions to: store the image information into a memory; receive a connection request from the second information processing apparatus; determine whether or not the image information is information of a screen for inputting information having confidentiality; combine an image of a cursor with the image information and cause the memory to store a result of the combining; and in a case that it is determined that the image information is the information of the screen for inputting information having confidentiality, restrict viewing of the image of the cursor in the image information and transmit the image information in which the viewing of the image of the cursor is restricted to the second information processing apparatus, and wherein the second information processing apparatus comprises: a second memory device that stores a set of instructions; and at least one processor that executes the instructions to: transmit to the first information processing apparatus an input event resulting from an operation by a user; receive the image information transmitted from the first information processing apparatus; and cause the display unit to display the image information.

According to a second aspect of the present invention, there is provided an information processing apparatus that transmits image information being displayed on a display unit to a client to cause the client to display the image information, comprising: a memory device that stores a set of instructions; and at least one processor that executes the instructions to: store the image information displayed on the display unit into a memory; determine whether or not the image information is information of a screen for inputting information having confidentiality; combine an image of a cursor with the image information and causes the memory to store a result of the combining; and control to, in a case that it is determined that the image information is information of the screen for inputting information having confidentiality, restrict viewing of the image of the cursor in the image information and transmit the image information in which the viewing of the image of the cursor is restricted to the client.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
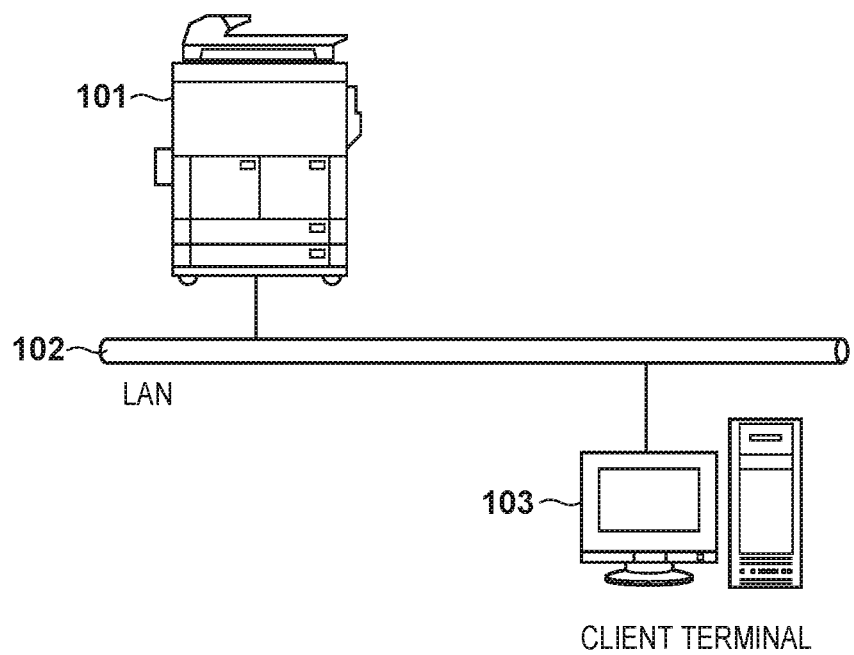
FIG. 1 depicts an overall view of an information processing system according to an embodiment of the present invention.

FIG. 1 depicts an overall view of an information processing system according to the embodiment of the present invention.

In FIG. 1, an image processing apparatus 101 is connected to a client terminal 103 via a LAN 102. Also, the image processing apparatus 101 functions as a server (the side that sends details of a VRAM) as an information processing apparatus, and also the client terminal 103 is a client, in other words, the client terminal 103 receives and displays the details of the VRAM (video memory) of the image processing apparatus 101.

Figure 2:
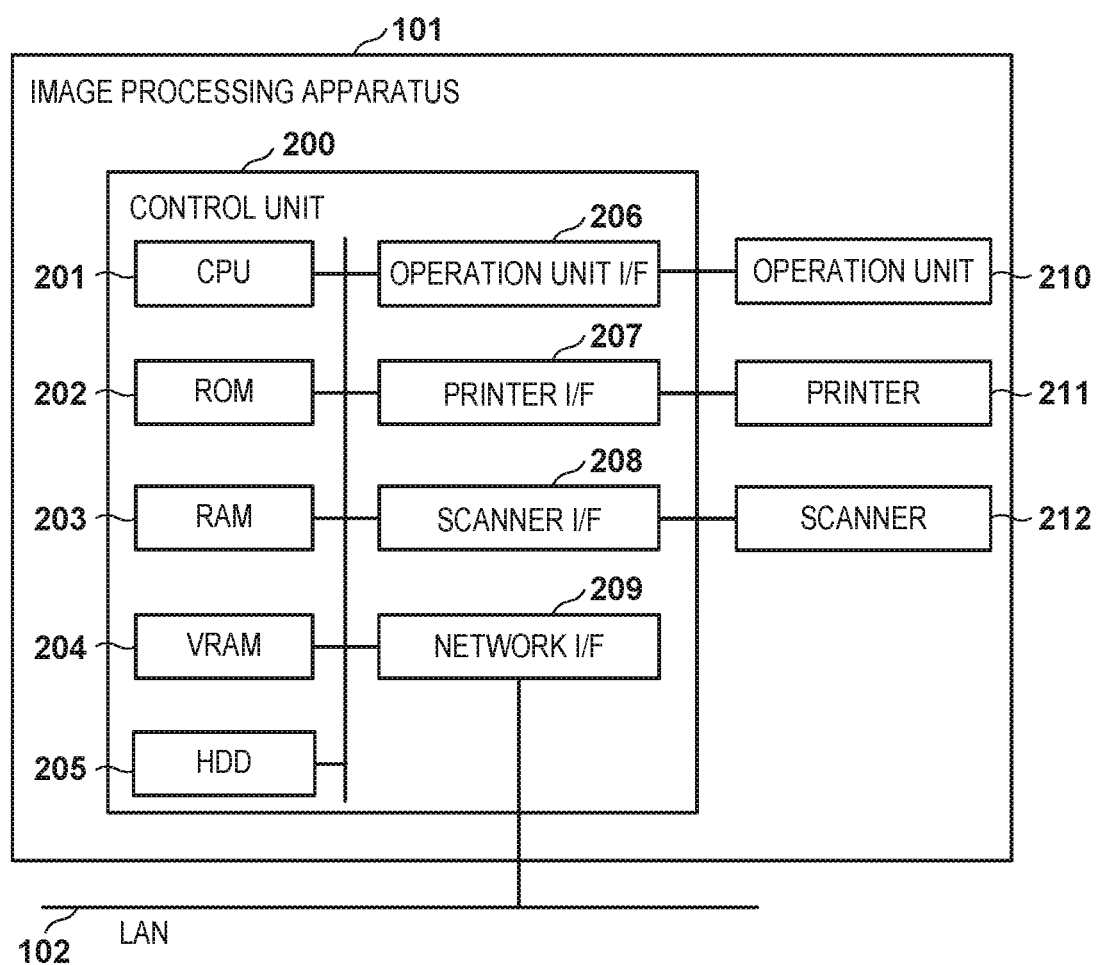
FIG. 2 is a block diagram for describing a hardware configuration of an image processing apparatus according to the embodiment of the present invention.

FIG. 2 is a block diagram for describing a hardware configuration of the image processing apparatus 101 according to the embodiment of the present invention.

A control unit 200, which includes a CPU 201, controls operations of the image processing apparatus 101 overall. The CPU 201, by a boot program stored in a ROM 202, reads an OS or a control program installed in an HDD 205 and deploys it into a RAM 203, and performs various control such as reading control or transmission control in accordance with the deployed program. The RAM 203 is used as a temporary storage area such as a main memory, a work area, or the like, of the CPU 201. Also, the RAM 203 is used as a virtual VRAM and also as a storage region for temporarily holding information for a screen display. A VRAM 204 is a storage unit for holding information for a screen display written from a virtual VRAM region of the RAM 203. Note, a region of a portion of the RAM 203 may be used as the VRAM 204. The HDD (hard disk drive) 205 stores image data, various programs, or various information tables.

An operation unit I/F (interface) 206 connects an operation unit 210 to the control unit 200. The operation unit 210 is equipped with a keyboard, a display unit having a touch panel function, and the like. Also, the operation unit 210 displays an image to the display unit based on image information held in the VRAM 204. A printer I/F 207 connects a printer 211 to the control unit 200. Image data to be printed by the printer 211 is transferred from the control unit 200 to the printer 211 via the printer I/F 207, and is printed on a printing medium (sheet) by the printer 211. A scanner I/F 208 connects a scanner 212 to the control unit 200. The scanner 212 generates image data by reading an image on an original, and inputs the image data to the control unit 200 via the scanner I/F 208. A network I/F 209 connects the control unit 200 to the LAN 102. The network I/F 209 transmits image data or information to an external device over the LAN 102 and receives various pieces of information from the external apparatus over the LAN 102.

Figure 3:
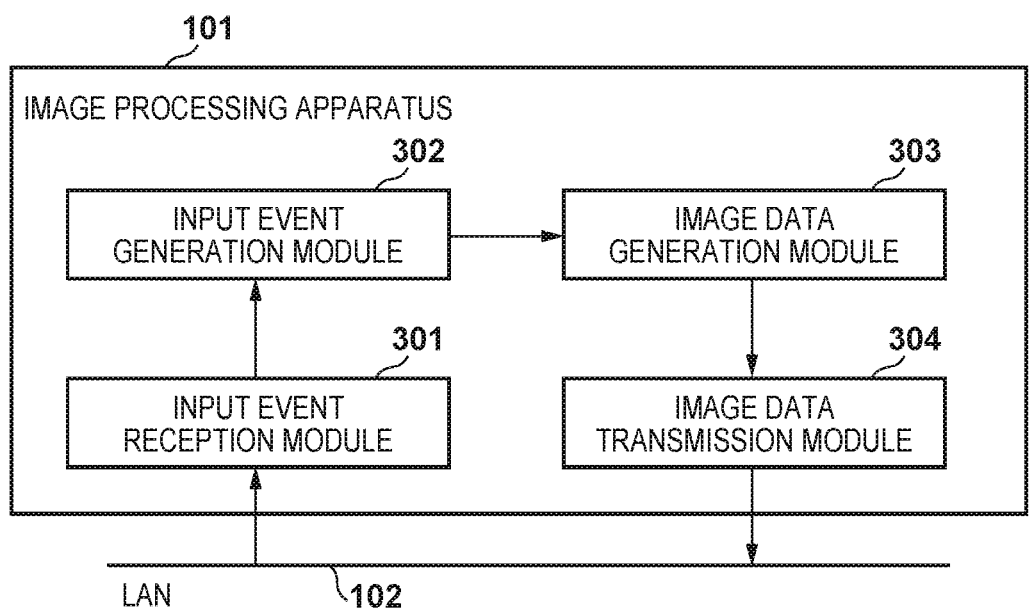
FIG. 3 is a block diagram for describing a software configuration of the image processing apparatus according to the embodiment.

FIG. 3 is a block diagram for describing a software configuration of the image processing apparatus 101 according to the embodiment. Note, each unit illustrated in FIG. 3 is realized by the CPU 201 equipped in the image processing apparatus 101 deploying a control program stored in the HDD 205 into the RAM 203 and executing it.

The image processing apparatus 101 is equipped with an input event reception module 301, an input event generation module 302, an image data generation module 303, and an image data transmission module 304. The input event reception module 301 holds an input event signal, transmitted from the client terminal 103 and received via the LAN 102, in the RAM 203. The input event generation module 302, based on the input event signal received by the input event reception module 301, generates an input event signal with respect to the image processing apparatus 101 and sends it to the image data generation module 303. The image data generation module 303, upon receiving the input event signal, generates image information reflecting the contents and holds the image information in a virtual VRAM region of the RAM 203. The image data transmission module 304 transmits the image information held in the virtual VRAM region of the RAM 203 to the client terminal 103 via the LAN 102. Note, the image information held in the VRAM 204 written from the virtual VRAM region of the RAM 203 may be transmitted to the client terminal 103.

Figure 4:
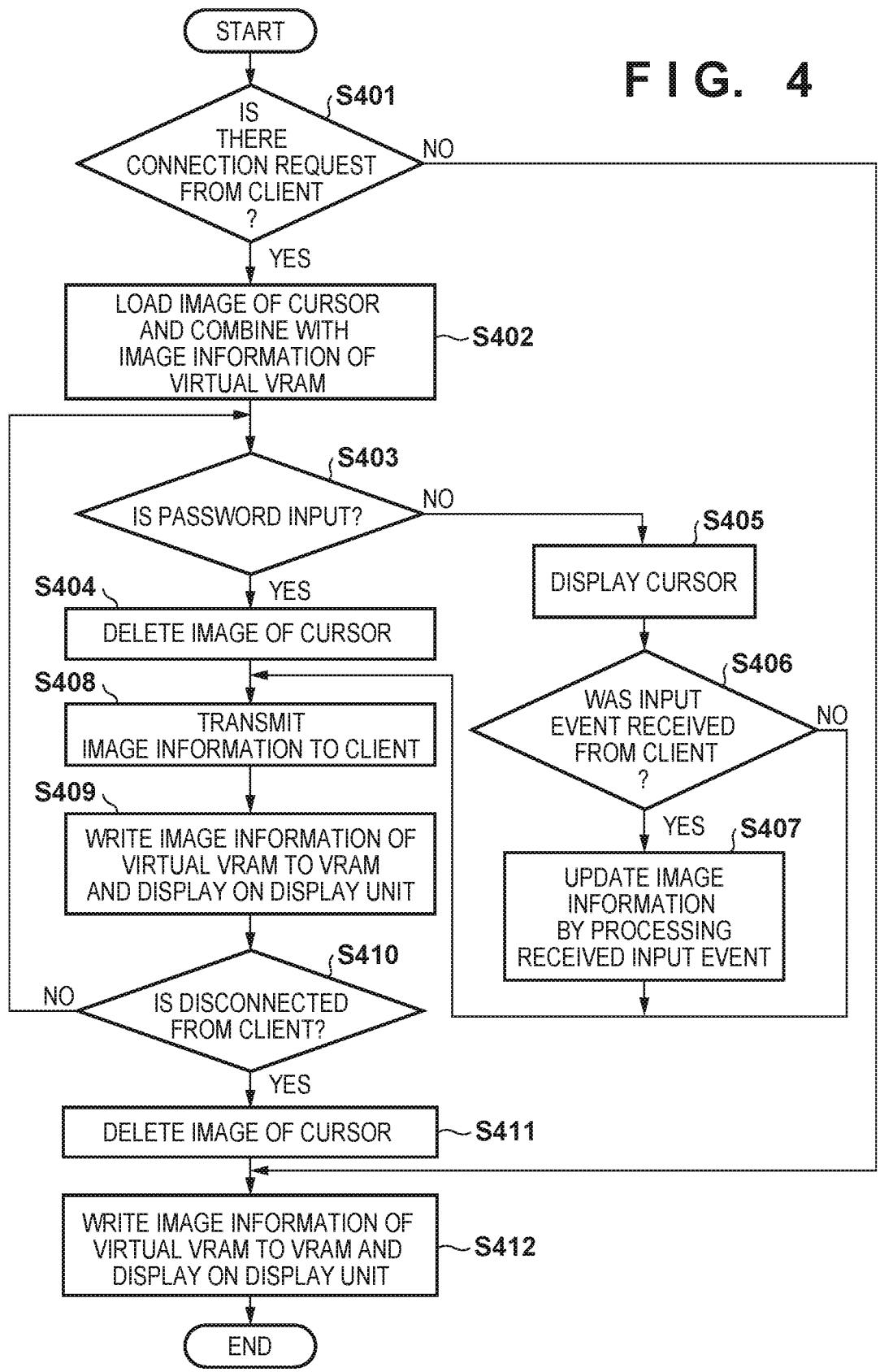
FIG. 4 is a flowchart for describing processing of the image processing apparatus according to the embodiment of the present invention.

FIG. 4 is a flowchart for describing processing of the image processing apparatus 101 according to the embodiment of the present invention. In this processing, when the image processing apparatus 101 distributes image information caused to be displayed on the client terminal 103, the image processing apparatus 101 combines a cursor with the screen information and displays it to the operation unit 210. Each step illustrated in the flowchart of FIG. 4 is realized by the CPU 201 of the image processing apparatus 101 deploying a control program stored in the ROM 202 or the HDD 205 into the RAM 203 and executing it.

This processing is started by the presence of an input event from the client terminal 103. Firstly, in step S401, the CPU 201 determines whether or not a connection request is received from the client terminal 103. Here, the CPU 201 advances the processing to step S402 in a case where it determines that the connection request was received from the client terminal 103. Meanwhile, when this is not the case, the CPU 201 advances the processing to step S412, displays image information held in the virtual VRAM region of the RAM 203 to the display unit of the operation unit 210, and ends this processing.

In step S402, the CPU 201 reads an image of a cursor stored in the ROM 202 or the HDD 205 and stores it in the RAM 203. Then, the CPU 201 combines the image of the cursor with the image information that the virtual VRAM region of the RAM 203 holds, and stores it to the virtual VRAM region.

In step S403, the CPU 201 determines whether or not the image information to be displayed, held in the virtual VRAM region of the RAM 203, is a screen for password input. Specifically, the CPU 201 determines whether a password input screen is displayed on the display unit of the operation unit 210. When displaying a virtual keyboard screen, the CPU 201 adds information of whether it is the virtual keyboard screen for inputting a password or not. Accordingly, the CPU 201 can determine whether or not the virtual keyboard screen is for inputting a password based on the information. In a case where the virtual keyboard screen on which the information indicating a keyboard screen for inputting a password is added is opened, it is determined that the password input screen is displayed on the display unit. In this way, when it is determined that a screen for password input is displayed on the display unit, the processing is advanced to step S404. When this is not the case, the processing is advanced to step S405. In step S404, the CPU 201 makes it so that the image of the cursor combined with the image information is not displayed, and advances the processing to step S408. Specifically, the CPU 201 deletes the image of the cursor loaded in the RAM 203 in step S402, and advances the processing to step S408.

Accordingly, when a password is inputted, the cursor is not displayed on the screen displayed on the display unit and also the cursor is not included in the image information to be transmitted to the client.

Meanwhile, in step S405, the CPU 201 combines the image of the cursor with the image information, and advances the processing to step S406. In other words, in a case where a screen for a password input is not being displayed on the display unit, the cursor is displayed on the screen. In step S406, the CPU 201 determines whether or not an input event transmitted from the client terminal 103 was received. Specifically, it is determined whether or not an input event signal transmitted from the client terminal 103 via the LAN 102 was received by the input event reception module 301. For example, when a click or movement by a pointing device is performed by the client terminal 103, the client terminal 103 transmits the designated coordinates along with information of the click or movement to the image processing apparatus 101 as an input event. By this, the image processing apparatus 101 receives the input event. In step S406, in a case where the CPU 201 determines that the input event is received, it advances the processing to step S407, and when this is not the case, it advances the processing to step S408. In step S407, the CPU 201 processes the received input event and updates the image information, and advances the processing to step S408.

Specifically, the input event generation module 302, based on the received input event signal, generates an input event signal with respect to the image processing apparatus 101 and sends it to the image data generation module 303. By this, the image data generation module 303 generates image information reflecting the contents after the input event is executed, and holds the image information in a virtual VRAM region of the RAM 203. For example, in a case where the received input event is a movement of the pointing device, the image data generation module 303 changes the position of the cursor (moves the cursor) based on the received coordinates along with the movement information, and generates and displays the image information.

In step S408, the CPU 201 transmits the image information held in the virtual VRAM region of the RAM 203 to the client terminal 103. By this, the client terminal 103 holds the received image information and displays it to the display unit of the client terminal 103. Next, the processing is advanced to step S409, and the CPU 201 writes the image information that the virtual VRAM region of the RAM 203 holds to the VRAM 204, and displays it to the display unit of the operation unit 210 via the operation unit I/F 206.

Next, the processing advances to step S410, and the CPU 201 determines whether or not communication with the client terminal 103 is disconnected. Here, although step S411 is advanced to in a case where it is determined that communication with the client terminal 103 is disconnected, when this is not the case, the processing is returned to step S403. In step S411, the CPU 201 deletes the image of the cursor combined with the image information, and clears the cursor. Then, the processing advances to step S412, and the CPU 201 writes the image information that the virtual VRAM region of the RAM 203 holds to the VRAM 204, and displays it to the display unit of the operation unit 210 via the operation unit I/F 206. By this, in step S412, because the image information is stored in the virtual VRAM region without the cursor being combined therewith, the CPU 201 displays an image to the display unit of the operation unit 210 in a state in which the cursor is not displayed. In place of deleting the cursor, a restriction may be made such as causing a mask image to be superimposed on the virtual keyboard so that a cursor operation cannot be viewed. A superimposition of the mask image may be performed by the image processing apparatus 101 or may be performed by the client terminal 103.

By executing such processing, it is possible to transmit image information including a cursor to the client terminal 103 and cause the display unit of the client terminal 103 to display the image information. Also, in a case where the image information transmitted to the client terminal 103 is a screen relating to security such as a password input screen for example, image information not including the cursor can be transmitted. By this, in the screen relating to security, it is possible to prevent the user of the client terminal knowing what keys are selected on the image processing apparatus 101.

Figure 5A:
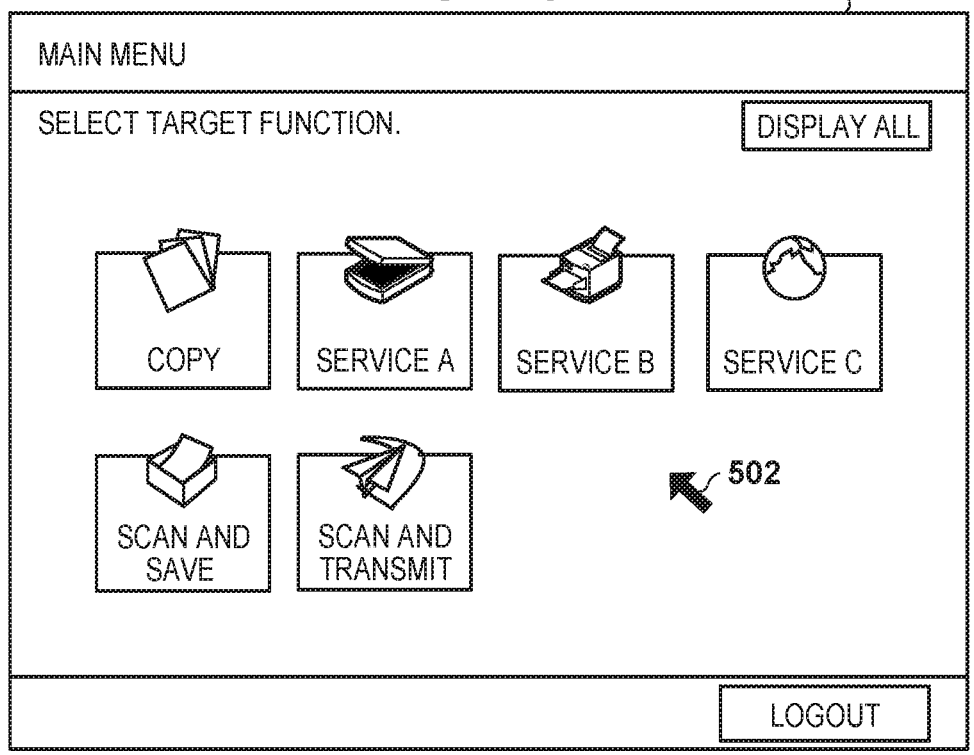
FIGS. 5A and 5B depict views illustrating examples in which the image processing apparatus according to the embodiment displays, on a display unit of an operation unit, image information stored in a VRAM.
Figure 5B:
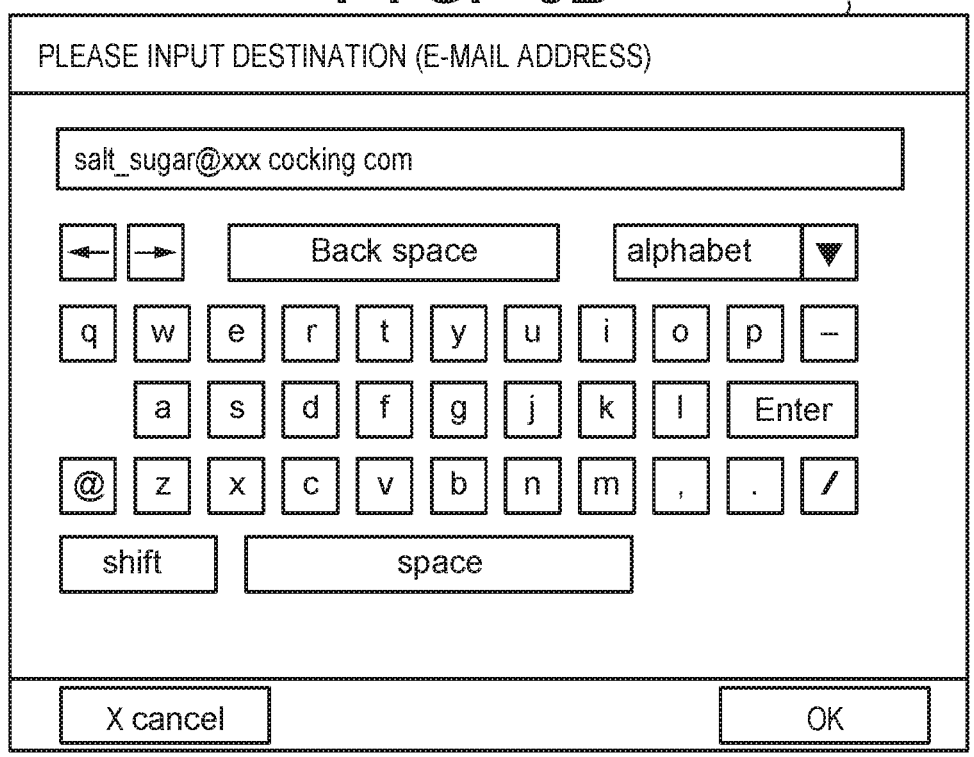

FIGS. 5A and 5B depict views illustrating examples in which the image processing apparatus 101 according to the embodiment in which image information stored in the VRAM 204 is displayed to the display unit of the operation unit 210.

FIG. 5A illustrates one example of a setting screen 501 displayed on the operation unit 210 in a case where it is determined that the image processing apparatus 101 displays a cursor. The setting screen 501 is a screen for a user to select and instruct various functions that the image processing apparatus 101 has. A cursor 502 is an object that moves in response to an input event. In this state, in a case where the user inputs confidential information, movement of the cursor will be transmitted to the client terminal 103, and operations details will be conveyed to the user of the client terminal 103.

In contrast, FIG. 5B illustrates one example of a keyboard screen 503 displayed on the operation unit 210 in a state in which the image processing apparatus 101 determines that a cursor not be displayed. The keyboard screen 503 is a screen for allowing a user of the image processing apparatus 101 to input an electronic mail address as a destination.

By this, it becomes impossible for an operator operating the client terminal 103 to confirm the destination input details by movement of the cursor in a case where the user inputs a destination via the keyboard screen 503. By this, it is possible to maintain security with respect to an input of a destination.

By virtue of the embodiment described above, it becomes possible to maintain confidentiality in a case where a user operating the image processing apparatus 101 inputs security information such as a password on the display unit of the operation unit 210. Also, in a case where an operator operating the client terminal 103 at the same time uses VNC and inputs security information by remotely controlling the image processing apparatus 101, it is possible to maintain confidentiality.

Note, in the embodiment, although whether a cursor is displayed or hidden is switched in accordance with whether or not the image processing apparatus 101 displays a password input screen, determination may be made by another condition. For example, a display/hiding of the cursor may be switched according to an instruction of a user using the image processing apparatus 101. Specifically, configuration may be taken such that a selection button for indicating whether or not to display a cursor on the display unit of the operation unit 210 of the image processing apparatus 101 is displayed, and the cursor is not displayed in a case where a user selects hide by the button. By this, there is the effect that it is possible to switch display/hiding of the cursor at an arbitrary timing and that it is possible to improve the user convenience.

Also, display/hiding of the cursor may be switched in accordance with a type of event from the client terminal. For example, configuration may be taken such that a hide cursor event can be received from the client terminal. In this case, processing for clearing a display of the cursor is immediately performed when a hide cursor event is received from the client terminal, after the cursor was displayed in step S405, for example. By this, there is the effect that it becomes possible to switch display/hiding of the cursor from the client terminal, and the convenience of operation on the client terminal is improved.

Note, although description is given by an example of an input of a password or a destination such as an electronic mail address as one example of information having confidentiality in the above described embodiment, information such as a serial number, a path name of a folder, and other confidential information for example may be the information having confidentiality. Also, information including personal information (privacy) such as an address or a telephone number may be treated as information having confidentiality. In this way, it is possible to restrict display of the cursor in a case where information having confidentiality is input.

By virtue of this embodiment as described above, when a cursor is being displayed on an operation unit of an image processing apparatus to allow a track of an operation from a terminal of a remote location to be confirmed, a cursor on the screen of the terminal of the remote location can be hidden when a security screen is displayed on the image processing apparatus. By this, it is possible to maintain confidentiality of an operation on the image processing apparatus because the operation on the image processing apparatus is not followed on the terminal of the remote location. By this, it becomes possible to cause efficiency of work support in the image processing apparatus to improve as well as to cause security to improve.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-243680, filed Dec. 15, 2016, which is hereby incorporated by reference herein in its entirety.

What is claimed is:

1. An information processing system having a first information processing apparatus for transmitting, by using VNC (Virtual Network Computing), image information of a screen displayed on a display unit of the first information processing apparatus, and a second information processing apparatus for receiving and displaying the transmitted image information, wherein the first information processing apparatus comprises:
a first memory device that stores a set of instructions; and
at least one processor that executes the instructions to:
store the image information into a memory;
receive a connection request from the second information processing apparatus;
combine an image of a pointer with the image information and cause the memory to store image information with which the image of the pointer has been combined in a case where the connection request has been received from the second information processing apparatus;
transmit the image information with which the image of the pointer has been combined;
display the image information with which the image of the pointer has been combined; and
when a screen for inputting information having confidentiality is displaying on the display unit of the first information processing apparatus, transmit image information of the screen for inputting the information having confidentiality to the second information processing apparatus and display the image information of the screen for inputting the information having confidentiality on the display unit without displaying the image of the pointer, wherein the transmitted image information does not include the image of the pointer, and
wherein the second information processing apparatus comprises:
a second memory device that stores a set of instructions; and
at least one processor that executes the instructions to:
transmit to the first information processing apparatus an input event resulting from an operation by a user;
receive the image information transmitted from the first information processing apparatus; and cause a display unit of the second information processing apparatus to display the image information.

2. The information processing system according to claim 1, wherein the first information processing apparatus, when the screen for inputting the information having confidentiality is displaying on the display unit of the first information processing apparatus, deletes the image of the pointer.

3. The information processing system according to claim 1, wherein the first information processing apparatus, in response to receiving the input event, transmits the image information to the second information processing apparatus.

4. The information processing system according to claim 1, wherein the at least one processor of the first information processing apparatus executes instructions in the first memory device to further,
when an input event is received from the second information processing apparatus, update, based on the input event, the image information stored in the memory.

5. An information processing apparatus that transmits, by using VNC (Virtual Network Computing), image information of a screen displayed on a display unit of the information processing apparatus to a client to cause the client to display the image information, comprising:
a memory device that stores a set of instructions; and
at least one processor that executes the instructions to:
store the image information displayed on the display unit into a memory;
combine an image of a pointer with the image information and causes the memory to store image information with which the image of the pointer has been combined in a case where a connection request has been received from the client;
transmit the image information with which the image of the pointer has been combined;
display the image information with which the image of the pointer has been combined; and
control to, when a screen for inputting information having confidentiality is displaying on the display unit, transmit image information of the screen for inputting the information having confidentiality to the client and display the image information of the screen for inputting the information having confidentiality on the display unit without displaying the image of the pointed,
wherein the transmitted image information does not include the image of the pointer.

6. The information processing apparatus according to claim 5, wherein the image of the pointer combined with the image information is deleted in the control when the screen for inputting the information having the confidentiality is displaying on the display unit.

7. The information processing apparatus according to claim 5, wherein, in the control, the image information stored in the memory is transmitted to the client in a case where it is determined that the image information is not the information of the screen for inputting information having confidentiality.

8. The information processing apparatus according to claim 5, wherein, in the control, the image information is transmitted to the client in response to receiving an input event from the client.

9. A method of controlling an information processing apparatus that transmits, by using VNC (Virtual Network Computing), image information of a screen displayed on a display unit of the information processing apparatus to a client to cause the client to display the image information, the method comprising:
storing the image information displayed on the display unit into a memory;
combining an image of a pointer with the image information and causing the memory to store image information with which the image of the pointer has been combined in a case where a connection request has been received from the client;
transmitting the image information with which the image of the pointer has been combined;
displaying the image information with which the image of the pointer has been combined;
and
controlling to, when a screen for inputting information having confidentiality is displaying on the display unit transmit image information of the screen for inputting the information having confidentiality to the client and display the image information of the screen for inputting the information having confidentiality on the display unit without displaying the image of the pointer,
wherein the transmitted image information does not include the image of the pointer.

10. A non-transitory computer-readable storage medium storing a program for causing a processor to execute a method of controlling an information processing apparatus that transmits, by using VNC (Virtual Network Computing), image information of a screen displayed on a display unit of the information processing apparatus to a client to cause the client to display the image information, the method comprising:
storing the image information displayed on the display unit into a memory;
combining an image of a pointer with the image information and causing the memory to store image information with which the image of the pointer has been combined in a case where a connection request has been received from the client;
transmitting the image information with which the image of the pointer has been combined;
displaying the image information with which the image of the pointer has been combined; and
controlling to, when a screen for inputting information having confidentiality is displaying on the display unit, transmit image information of the screen for inputting the information having confidentiality to the client and display the image information of the screen for inputting the information having confidentiality on the display unit without displaying the image of the pointer,
wherein the transmitted image information does not include the image of the pointer.

* * * * *